(12) United States Patent
Kim

(10) Patent No.: US 10,899,268 B1
(45) Date of Patent: Jan. 26, 2021

(54) LAMP HAVING BUILT-IN SENSOR, LAMP ASSEMBLY, BLIND-SPOT DETECTION SYSTEM, AND BLIND-SPOT DETECTION METHOD

(71) Applicants: HYUNDAI MOTOR COMPANY, Seoul (KR); KIA MOTORS CORPORATION, Seoul (KR)

(72) Inventor: Min Han Kim, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/851,518

(22) Filed: Apr. 17, 2020

(30) Foreign Application Priority Data

Dec. 12, 2019 (KR) .......................... 10-2019-0166062

(51) Int. Cl.
| | |
|---|---|
| *G01N 21/00* | (2006.01) |
| *B60Q 1/00* | (2006.01) |
| *F21S 43/235* | (2018.01) |
| *F21S 43/27* | (2018.01) |
| *F21S 43/30* | (2018.01) |
| *F21V 14/02* | (2006.01) |
| *F21S 43/40* | (2018.01) |
| *G01V 8/20* | (2006.01) |
| *F21S 43/20* | (2018.01) |
| *F21S 45/47* | (2018.01) |

(52) U.S. Cl.
CPC .......... *B60Q 1/0023* (2013.01); *B60Q 1/0035* (2013.01); *B60Q 1/0041* (2013.01); *F21S 43/235* (2018.01); *F21S 43/26* (2018.01); *F21S 43/27* (2018.01); *F21S 43/30* (2018.01); *F21S 43/40* (2018.01); *F21V 14/02* (2013.01); *G01V 8/20* (2013.01); *F21S 45/47* (2018.01)

(58) Field of Classification Search
CPC .. B60Q 1/0023; B60Q 1/0041; B60Q 1/0035; F21S 43/40; F21S 43/27; F21S 43/26; F21S 43/30; F21S 43/235; F21S 45/47; G01V 8/02; F21V 14/02
See application file for complete search history.

(56) References Cited

U.S. PATENT DOCUMENTS 7,068,159 B2 * 6/2006 Ko ...................... B60Q 1/2607
340/468

\* cited by examiner

*Primary Examiner* — Abdullahi Nur
(74) *Attorney, Agent, or Firm* — Morgan, Lewis & Bockius LLP

(57) ABSTRACT

A lamp having a built-in sensor includes a lamp housing having a lamp opening on one side thereof in a longitudinal direction of the lamp, a light-transmitting outer glass that covers the lamp opening, a light guide that is disposed on an inside surface of the lamp housing and that emits light, an inner glass located ahead of the light guide inside the lamp housing with respect to the longitudinal direction, and a sensor that is disposed inside the lamp housing and located ahead of the inner glass with respect to the longitudinal direction and that senses a surrounding object.

14 Claims, 21 Drawing Sheets

LAMP HAVING BUILT-IN SENSOR, LAMP ASSEMBLY, BLIND-SPOT DETECTION SYSTEM, AND BLIND-SPOT DETECTION METHOD

CROSS-REFERENCE TO RELATED APPLICATION

The present application claims the benefit of priority to Korean Patent Application No. 10-2019-0166062, filed on Dec. 12, 2019 in the Korean Intellectual Property Office, the entire disclosure of which is incorporated herein by reference.

TECHNICAL FIELD

The present disclosure relates to a lamp having a built-in sensor that detects an object located around a commercial vehicle, and to a lamp assembly, a blind-spot detection system, and a blind-spot detection method.

BACKGROUND

In the case of a commercial vehicle, a driver has difficulty identifying a rear side with naked eyes due to the size of the commercial vehicle, and therefore a rear detection sensor or a camera is actively utilized in the commercial vehicle. A separate space is required to place the sensor. Various mounting conditions, such as a character line of a vehicle, the thickness of paint, clearance with a surrounding metal object, and the like, have to be considered to place the sensor. In particular, in the case of a large truck having a limited rear viewing area and a large blind spot, it is difficult to find a mounting position satisfying the conditions.

In the case of a pickup truck having a vertical lamp, a sensor may be disposed with the lamp. However, such a method may not be identically applied to a light truck or a trailer vehicle in which a vertical lamp is not able to be placed due to a three-side loading door.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides a simplified lamp having a built-in sensor, a lamp assembly, a blind-spot detection system, and a blind-spot detection method of a commercial vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp having a built-in sensor includes a lamp housing having a lamp opening on one side thereof in a longitudinal direction of the lamp, a light-transmitting outer glass that covers the lamp opening, a light guide that is disposed on an inside surface of the lamp housing and that emits light, an inner glass located ahead of the light guide inside the lamp housing with respect to the longitudinal direction, and a sensor that is disposed inside the lamp housing and located ahead of the inner glass with respect to the longitudinal direction and that senses a surrounding object.

According to another aspect of the present disclosure, a lamp assembly includes a lamp having a built-in sensor, the lamp including a sensor that senses a surrounding object and a light guide that emits light, a rear lamp including a light-emitting part that emits light, and a rotary part that connects the rear lamp and the lamp having the built-in sensor such that the rear lamp and the lamp are rotatable relative to each other.

According to another aspect of the present disclosure, a blind-spot detection system includes at least four lamp assemblies that detect a surrounding object, a vehicle having the at least four lamp assemblies coupled to opposite rear sides and opposite lateral sides of the vehicle, the at least four lamp assemblies being rotatable with respect to the vehicle, a towed vehicle coupled to a rear side of the vehicle, and a processor electrically connected with the at least four lamp assemblies. Lamps having built-in sensors that are included in the lamp assemblies are disposed to face toward the opposite lateral sides of the vehicle, and when one lamp assembly located in a direction in which the vehicle turns, among the lamp assemblies disposed on the opposite rear sides, detects an abnormal signal, the processor performs control to stop operation of the lamp having the built-in sensor of the lamp assembly that detects the abnormal signal.

According to another aspect of the present disclosure, provided is a method for detecting a blind spot using at least four lamp assemblies that detect a surrounding object and a vehicle having the at least four lamp assemblies coupled to opposite rear sides and opposite lateral sides of the vehicle so as to be rotatable relative to each other. The method includes determining whether a towed vehicle connected to the vehicle is present, determining whether two rear lamp assemblies disposed on the opposite rear sides of the vehicle among the at least four lamp assemblies face a lateral direction, when the towed vehicle is present, detecting an abnormal signal by a rear lamp assembly of the two rear lamp assemblies, the rear lamp assembly located in a direction in which the vehicle turns, when lamps having built-in sensors that are included in the two rear lamp assemblies face the lateral direction and the vehicle turns, and stopping operation of the rear lamp assembly that detects the abnormal signal.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
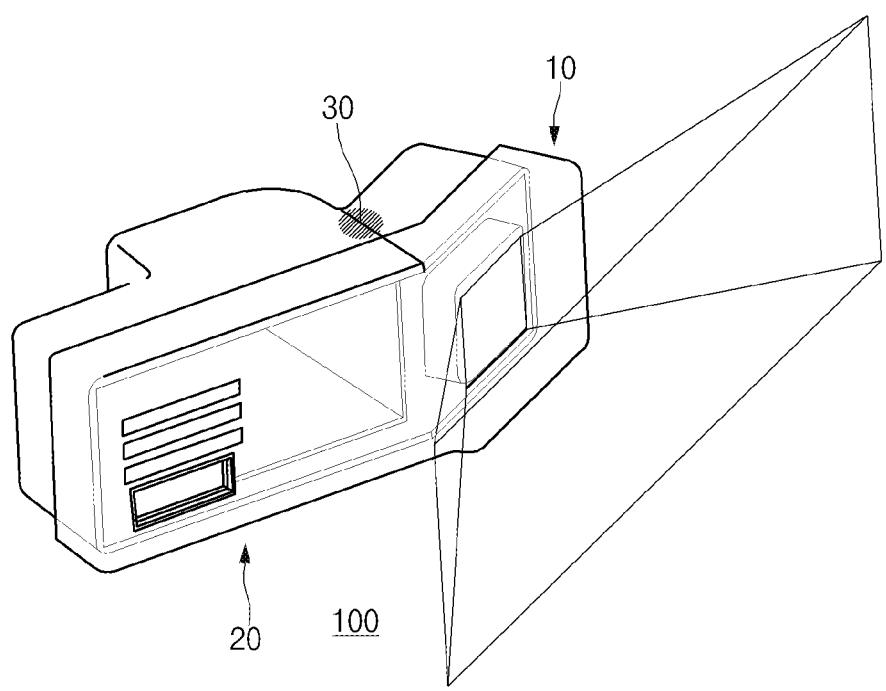
FIG. 1 is a perspective view illustrating a lamp assembly including a lamp having a built-in sensor according to a first exemplary embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. When a component is described as "connected", "coupled", or "linked" to another component, this may mean the components are not only directly "connected", "coupled", or "linked" but also are indirectly "connected", "coupled", or "linked" via a third component.

FIG. 1 is a perspective view illustrating a lamp assembly 100 including a lamp 10 having a built-in sensor according to a first exemplary embodiment of the present disclosure.

The lamp assembly 100 according to the first embodiment of the present disclosure includes the lamp 10 having the built-in sensor, a rear lamp 20, and a rotary part 30. The lamp 10 having the built-in sensor and the rear lamp 20 may be coupled through the rotary part 30 to face directions not parallel to each other. The rear lamp 20 may be configured to face an aft direction and emit light in the aft direction.

Lamp 10 Having the Built-in Sensor

Figure 2:
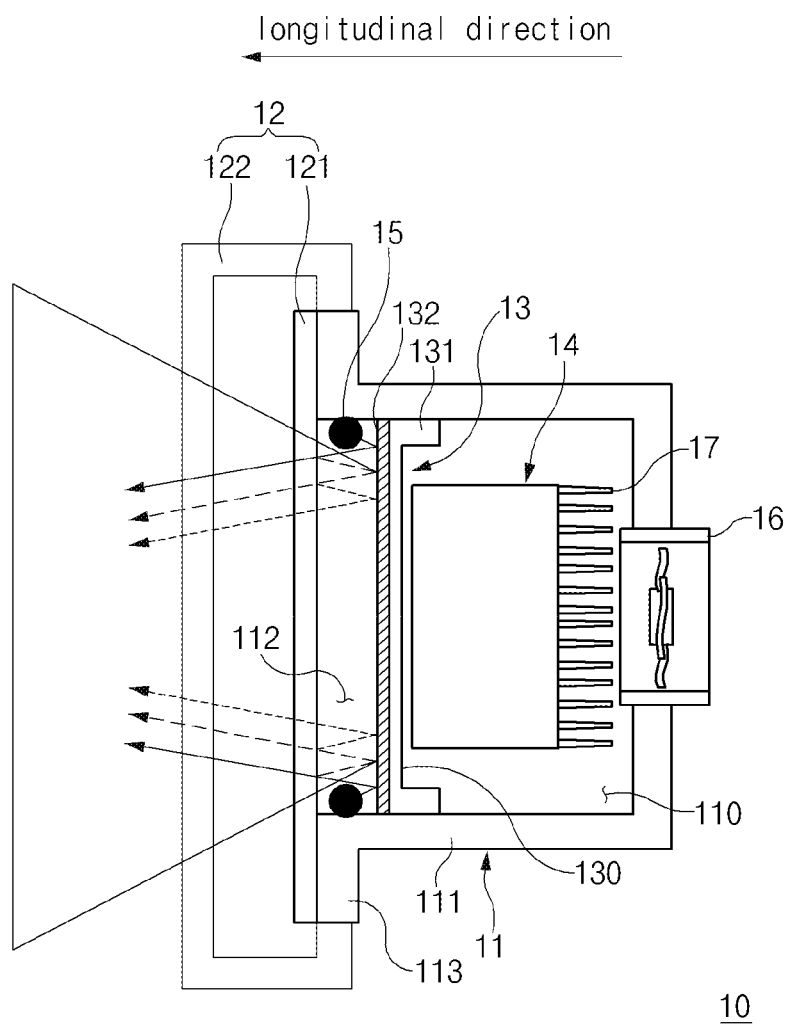
FIG. 2 is a schematic view illustrating the lamp having the built-in sensor according to the first exemplary embodiment of the present disclosure.

FIG. 2 is a schematic view illustrating the lamp 10 having the built-in sensor according to the first embodiment of the present disclosure.

The lamp 10 having the built-in sensor may include a lamp housing 11, an outer glass 121, an inner glass 13, a light guide 15, and a sensor 14 and may include an outer lens 122, a cooling fan 16, and a cooling fin 17.

The lamp housing 11 is a housing having a lamp opening 112 on a rear side thereof. A lamp housing flange 113 further protruding outward from the periphery of the lamp opening 112 beyond a lamp housing body 111 may be disposed. The lamp housing flange 113 may allow other components such as the outer glass 121 to be more stably and firmly coupled to the lamp housing 11.

The outer glass 121 is a light-transmitting member that covers the lamp opening 112. The outer glass 121 may be coupled to the lamp housing flange 113 of the lamp housing 11 to close an interior space 110 of the lamp housing 11.

The outer glass 121 may constitute an outer optical part 12 together with the outer lens 122 that is disposed behind the outer glass 121 and through which light transmitted through the outer glass 121 in the aft direction passes. The outer lens 122 may refract the path of light emitted through the outer glass 121 such that the light emitted through the outer glass 121 forms an image.

The light guide 15 is disposed on an inside surface of the lamp housing 11 and emits light. Accordingly, the light guide 15 may include a device, such as a light emitting diode (LED), which is able to emit light. However, the type of the light guide 15 is not limited thereto. A plurality of light guides 15 may be disposed inside the lamp housing 11.

The light guide 15 on the inside surface of the lamp housing 11 may obliquely emit light in the fore/aft direction, and the light may directly travel to the outside through the outer glass 121, or the light may be reflected in the space formed between the outer glass 121 and the inner glass 13 and may thereafter travel to the outside through the outer glass 121.

Inside the lamp housing 11, the inner glass 13 is located ahead of the light guide 15 with respect to a longitudinal direction of the lamp 10 (e.g., FIG. 2). The inner glass 13 may be formed of a light-transmitting material. A ring-shaped inner glass rim 131 may protrude forward along the periphery of an inner glass body 130, and the inner glass 13 may be more firmly and stably coupled to the lamp housing 11 by coupling an outside surface of the inner glass rim 131 to the inside surface of the lamp housing 11.

The inner glass 13 may include a reflection surface 132 on a rear side thereof. Accordingly, light emitted from the light guide 15 may face toward the outer glass 121 by being reflected from the reflection surface 132. Furthermore, the light may face toward the inner glass 13 by being reflected from a front side of the outer glass 121.

The reflection surface 132 has reflectivity such that light emitted from the light guide 15 is reflected between the inner glass 13 and the outer glass 121 or transmitted to the outside through the outer glass 121 to form an image. As illustrated, some light is directly transmitted to the outside through the outer glass 121, and other light is transmitted through the outer glass 121 after reflected. At this time, the number of times that light is reflected may vary from light to light.

The sensor 14 is disposed in the interior space 110 of the lamp housing 11. The sensor 14 may be disposed ahead of the inner glass 13 with respect to the longitudinal direction. The sensor 14 may sense a surrounding object. The sensor 14 may generate a sensing signal, based on contents obtained by detecting an approaching object by generating waves. Accordingly, the sensor 14 may include a device capable of detecting an adjacent object in a non-contact manner and may form a radar system. An ultrasonic sensor using ultrasonic waves or an IR sensor using infrared light, which is an electromagnetic wave, may be used as a sensor that transmits electric waves. However, the type of the sensor is not limited thereto.

The sensor 14 includes a transmitter and a receiver and causes waves generated and emitted from the transmitter to be reflected by an adjacent object. The reflected waves are received by the receiver, and the sensor 14 generates a sensing signal based on the waves received by the receiver and transfers the generated sensing signal to a processor. An encoder may be additionally connected to the receiver and may convert the sensing signal based on the received waves into a digital signal.

The cooling fan 16 may be installed on a front side of the lamp housing 11 to cool the sensor 14. The cooling fan 16 may include rotary blades and may cool the sensor 14 using an air flow generated by rotation of the blades. Furthermore, the cooling fin 17 may be attached to a front side of the sensor 14 to cool the sensor 14. A plurality of cooling fins 17 may be provided. The cooling fins 17 may make contact with the sensor 14 and may dissipate heat transferred from the sensor 14.

Figure 3:
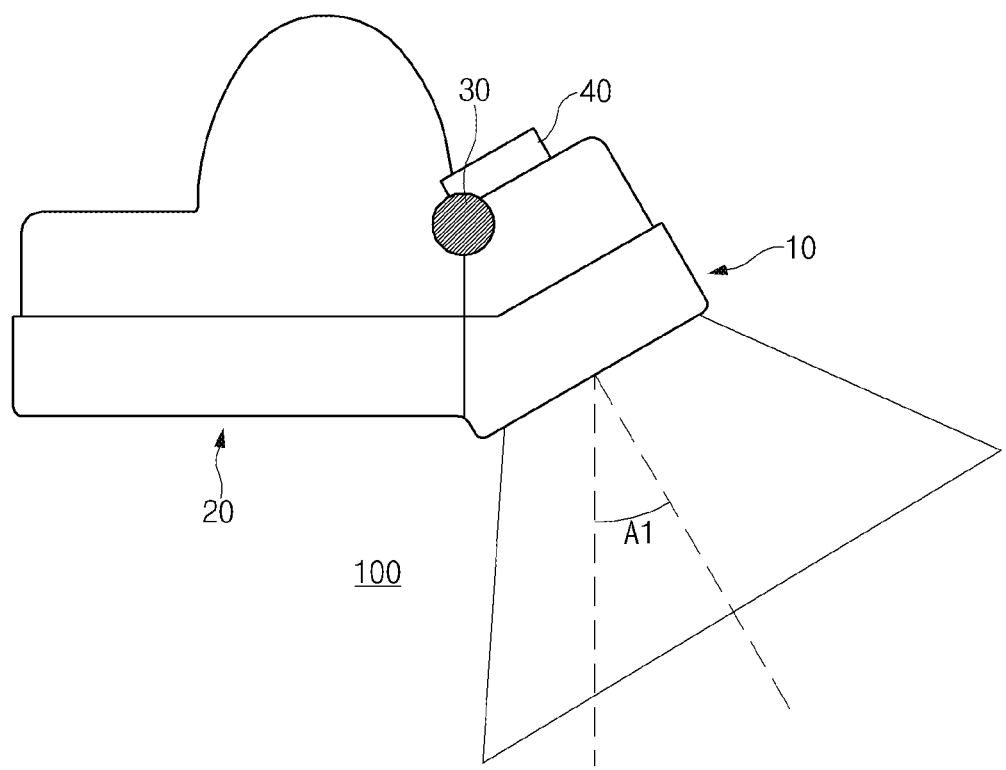
FIG. 3 is a plan view illustrating the lamp assembly according to the first embodiment of the present disclosure.
Figure 4:
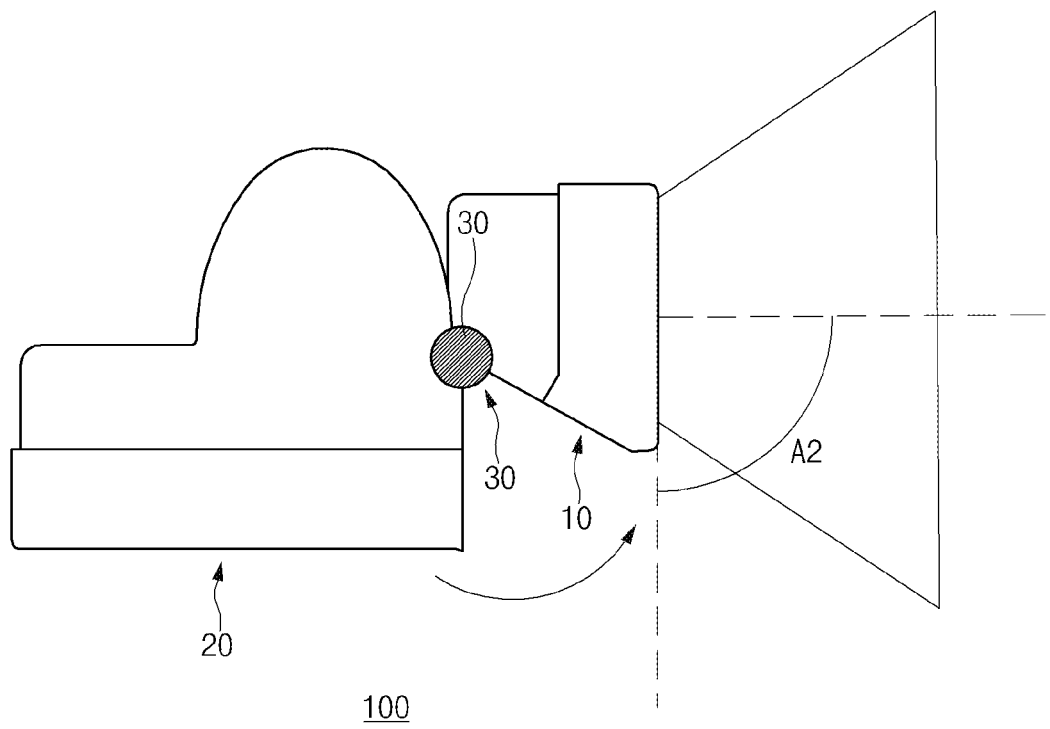
FIG. 4 is a view illustrating a state in which the lamp having the built-in sensor is rotated in the lamp assembly of FIG. 3.

FIG. 3 is a plan view illustrating the lamp assembly 100 according to the first embodiment of the present disclosure. FIG. 4 is a view illustrating a state in which the lamp 10 having the built-in sensor is rotated in the lamp assembly 100 of FIG. 3.

Referring to FIGS. 3 and 4, the lamp 10 having the built-in sensor and the rear lamp 20 of the lamp assembly 100 are coupled by the rotary part 30 so as to be rotatable relative to each other. A connector 40 may be disposed on a front side of the lamp 10 having the built-in sensor. Wiring may be connected to the connector 40, and the lamp 10 having the built-in sensor may be electrically connected to the processor.

When the position of the rear lamp 20 is fixed, the lamp 10 having the built-in sensor may rotate relative to the rear lamp 20 as illustrated. Accordingly, the internal angle formed by a straight line parallel to the direction that the lamp 10 having the built-in sensor faces and a straight line parallel to the direction that the rear lamp 20 faces may have a minimum value of A1 when the lamp 10 and the rear lamp 20 are arranged as in FIG. 3 and may have a maximum value of A2 when the lamp 10 is rotated and located as in FIG. 4. When the lamp assembly 100 is disposed as in FIG. 3, the lamp 10 having the built-in sensor may detect an object located in an aft direction and may irradiate light. When the lamp assembly 100 is disposed as in FIG. 4, the lamp 10 having the built-in sensor may detect an object located in a lateral direction and may irradiate light.

Rear Lamp 20

Figure 5:
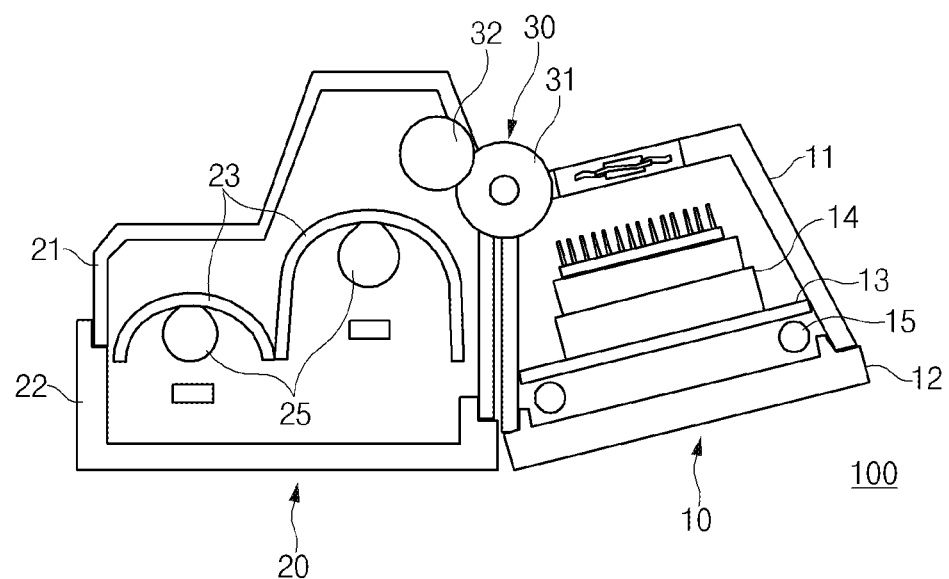
FIG. 5 is a schematic view illustrating the lamp assembly according to the first embodiment of the present disclosure.
Figure 6:
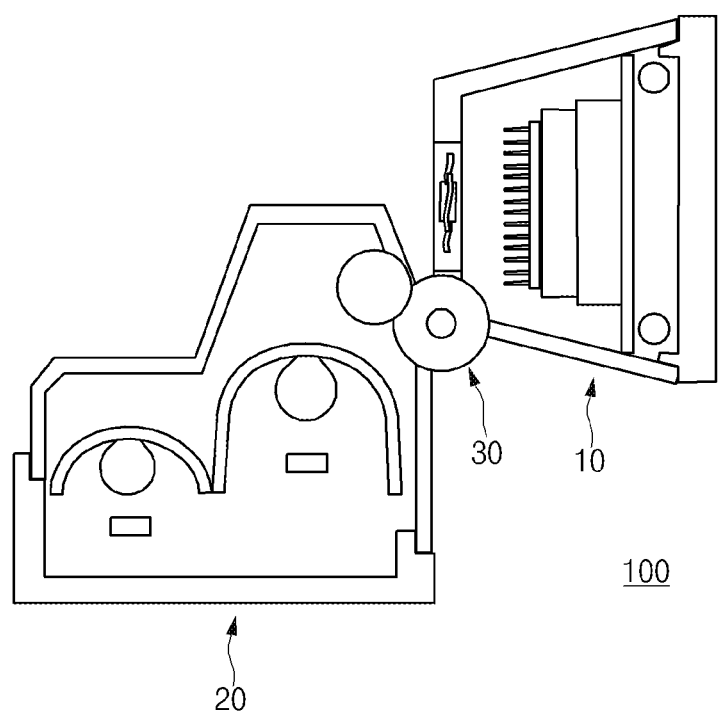
FIG. 6 is a schematic view illustrating a state in which the lamp assembly according to the first exemplary embodiment of the present disclosure is rotated.

FIG. 5 is a schematic view illustrating the lamp assembly 100 according to the first embodiment of the present disclosure. FIG. 6 is a schematic view illustrating a state in which the lamp assembly 100 according to the first embodiment of the present disclosure is rotated.

The rear lamp 20 is a component that emits light and allows the lamp assembly 100 to function as a general rear lamp. Accordingly, the rear lamp 20 may include a light emitting part 25 that emits light, and a plurality of light emitting parts 25 may be provided. The rear lamp 20 may further include a rear lamp optical part 23 that guides light emitted from the light emitting part 25 in a desired direction by allowing the light to be reflected and collected or spread. The rear lamp 20 may include a rear lamp housing 21 in which the light emitting part 25 is embedded. The rear lamp 20 may include a rear lamp glass 22 that is formed of a light-transmitting material to allow light emitted from the light emitting part 25 to travel in an aft direction and that is coupled to a rear side of the rear lamp housing 21.

The rear lamp housing 21 and the lamp housing 11 are coupled to the rotary part 30 so as to be rotatable. Accordingly, the rear lamp housing 21 and the lamp housing 11 are able to rotate relative to each other.

Rotary Part 30

Figure 7:
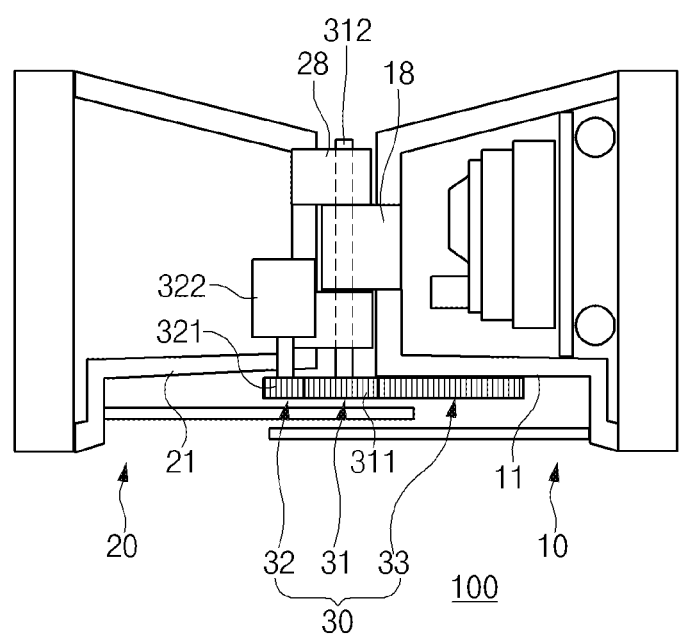
FIG. 7 is a schematic side view illustrating a rotary structure of the lamp assembly according to the first exemplary embodiment of the present disclosure.
Figure 8:
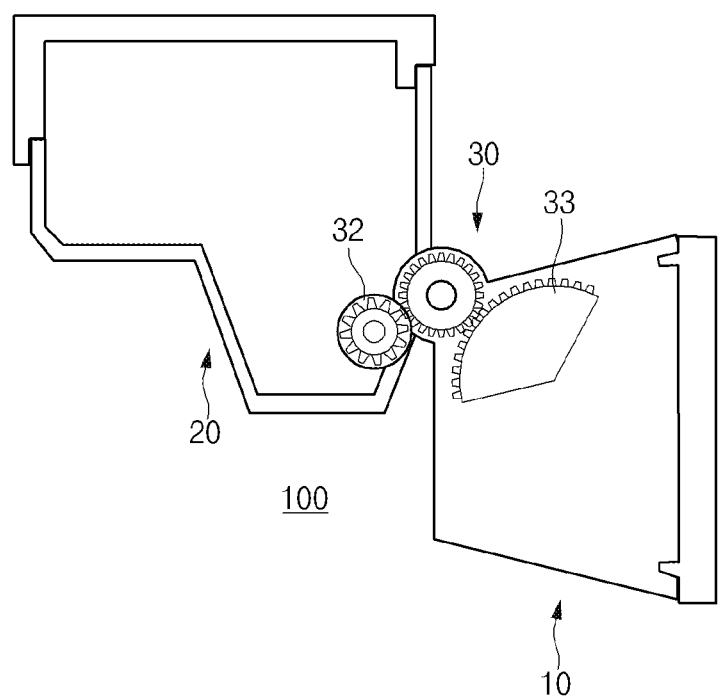
FIG. 8 is a schematic top view illustrating the rotary structure of the lamp assembly according to the exemplary first embodiment of the present disclosure.

FIG. 7 is a schematic side view illustrating a rotary structure of the lamp assembly 100 according to the first embodiment of the present disclosure. FIG. 8 is a schematic top view illustrating the rotary structure of the lamp assembly 100 according to the first embodiment of the present disclosure.

The rotary part 30 is a component that connects the rear lamp 20 and the lamp 10 having the built-in sensor such that the rear lamp 20 and the lamp 10 having the built-in sensor are rotatable relative to each other. The rotary part 30 may include a hinge gear part 31 including a hinge shaft 312 and a reduction gear 311, a drive part 32 including an actuator 322 and a drive gear 321, a driven gear 33, etc.

The hinge gear part 31 is a part serving as a central shaft of the rotary part 30. A lamp hinge part and a rear lamp hinge part may be formed on the lamp housing 11 and the rear lamp housing 21. The hinge shaft 312 that serves as a shaft member of the lamp hinge part and the rear lamp hinge part passes through the hinge parts to rotatably couple the hinge parts. The reduction gear 311 may be disposed at the distal end of the hinge shaft 312.

The drive part 32 may include the actuator 322 that generates a driving force using electric power to operate the rotary part 30, and the drive gear 321 engaged with the reduction gear 311 to transmit torque generated by the actuator 322. The actuator 322 may rotate in one direction and an opposite direction. The actuator 322 may be disposed inside the rear lamp housing 21 as illustrated. However, the position of the actuator 322 is not limited thereto. The drive gear 321 may be rotated by the driving force of the actuator 322.

The driven gear 33 may be engaged with the reduction gear 311 to rotate. According to the first embodiment of the present disclosure, the driven gear 33 may have gear teeth formed on the outer circumferential surface thereof as illustrated. The driven gear 33 may be coupled to the lamp housing 11, and when the driven gear 33 rotates, the lamp housing 11 may rotate together in conjunction with the driven gear 33. That is, the drive gear 321, the reduction gear 311, and the driven gear 33 may be rotated by the driving force generated by the actuator 322 and may rotate the lamp 10 having the built-in sensor relative to the rear lamp 20.

Figure 9:
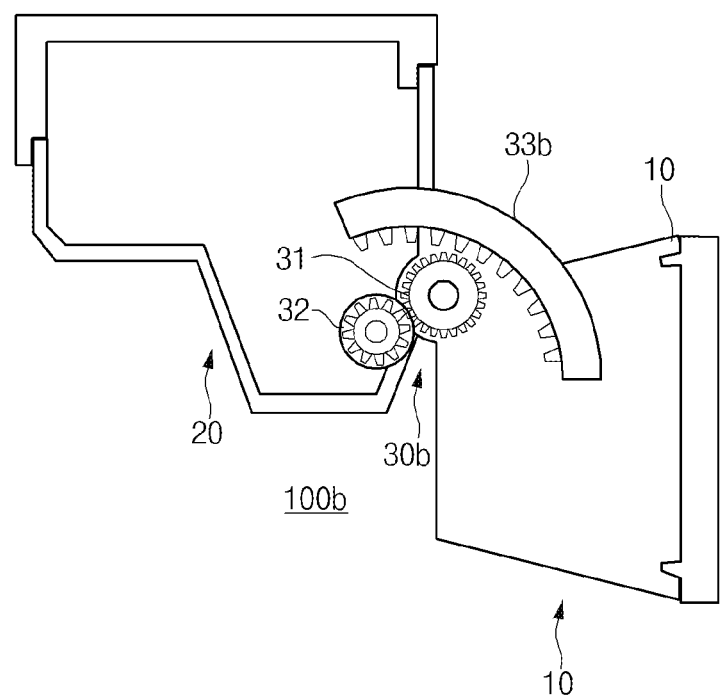
FIG. 9 is a schematic top view illustrating a rotary structure of a lamp assembly according to a second exemplary embodiment of the present disclosure.

FIG. 9 is a schematic top view illustrating a rotary structure of a lamp assembly 100b according to a second exemplary embodiment of the present disclosure.

The second embodiment of the present disclosure is the same as the first embodiment as a whole. Therefore, only a difference between the first embodiment and the second embodiment will be described below. Referring to FIG. 9, a rotary part 30b of the lamp assembly 100b according to the second embodiment of the present disclosure may include a driven gear 33b that is formed in an arc shape and that has gear teeth formed on the inner circumferential surface thereof.

Figure 10:
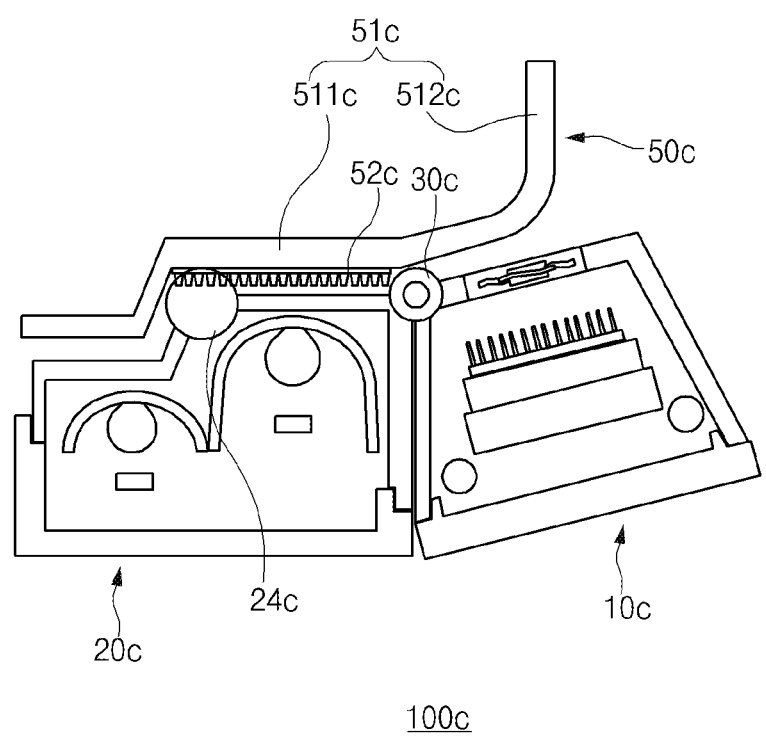
FIG. 10 is a schematic view illustrating a lamp assembly according to a third exemplary embodiment of the present disclosure.
Figure 11:
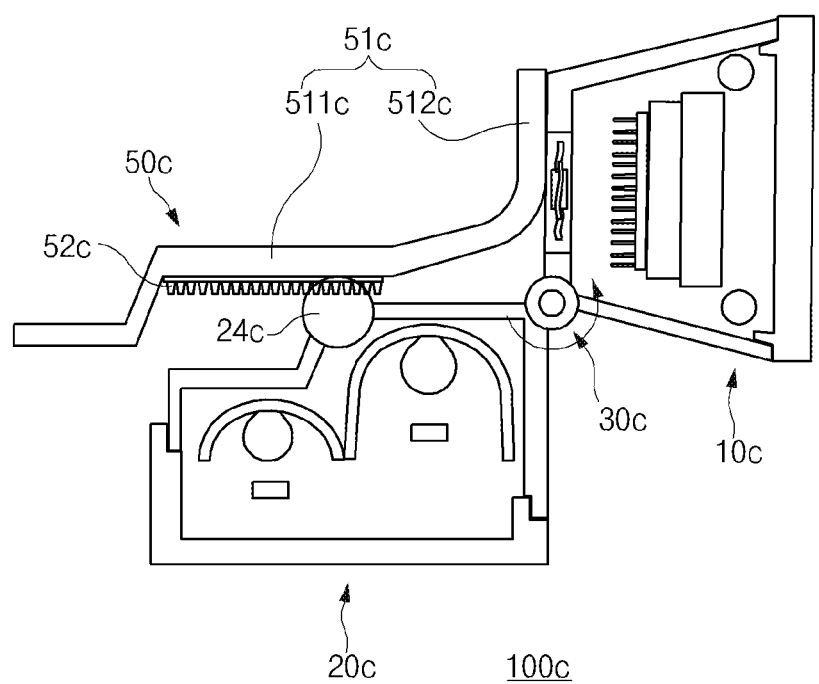
FIG. 11 is a schematic view illustrating a state in which a lamp having a built-in sensor is rotated in the lamp assembly of FIG. 10.

FIG. 10 is a schematic view illustrating a lamp assembly 100c according to a third exemplary embodiment of the present disclosure. FIG. 11 is a schematic view illustrating a state in which a lamp 10c having a built-in sensor is rotated in the lamp assembly 100c of FIG. 10.

The third embodiment of the present disclosure is the same as the first embodiment as a whole. Therefore, only a difference between the first embodiment and the third embodiment will be described below. Referring to FIGS. 10 and 11, the lamp assembly 100c according to the third embodiment may further include a guide rail part 50c. A guide rail 51c included in the guide rail part 50c is a component to which a rear lamp 20c is slidably coupled. The guide rail 51c may be fixed to a vehicle body.

The guide rail 51c has a form extending along a path along which the lamp assembly 100c moves. The guide rail 51c may include a left/right rail part 511c that extends in a left/right direction to allow the rear lamp 20c to slide rectilinearly and a fore/aft rail part 512c that extends in a fore/aft direction to support the lamp 10c having the built-in sensor when the lamp 10c having the built-in sensor that faces an aft direction is rotated by a movement of the rear lamp 20c and disposed to face a lateral direction.

To allow the rear lamp 20c to slide along the guide rail 51c, the guide rail 51c may include a rack gear part 52c disposed on the guide rail 51c, and a rectilinear-motion actuator 24c may be disposed on the rear lamp 20c. A shaft that outputs torque of the rectilinear-motion actuator 24c may be engaged with gear teeth of the rack gear part 52c, and the rear lamp 20c may perform rectilinear motion along the rack gear part 52c as the rectilinear-motion actuator 24c generates torque. The positions of the rack gear part 52c and the rectilinear-motion actuator 24c may be interchanged.

A rotary part 30c may rotate the lamp 10c having the built-in sensor relative to the rear lamp 20c as the rear lamp 20c slides along the guide rail 51c. As the rear lamp 20c moves from left to right in the drawing, a space in which the lamp 10c having the built-in sensor is rotatable is formed, and the rotary part 30c operates to allow the lamp 10c having the built-in sensor to face a lateral direction.

However, when the rear lamp 20c slides along the guide rail 51c, the lamp 10c having the built-in sensor may automatically rotate relative to the rear lamp 20c. The rotary part 30c may include a torsion spring. The torsion spring may remain compressed or stretched in the position of FIG. 10, and when the rear lamp 20c performs rectilinear motion, the torsion spring may apply elastic force to move the lamp 10c having the built-in sensor to a position facing a lateral direction. In contrast, when the rear lamp 20c performs rectilinear motion, the lamp 10c having the built-in sensor may be pressed by the guide rail 51c and may be moved to a position facing an aft direction, and the torsion spring may be compressed or stretched. In this case, it is enough that the rotary part 30c simply serves as a hinge, and therefore the rotary part 30c may not include an actuator.

Figure 12:
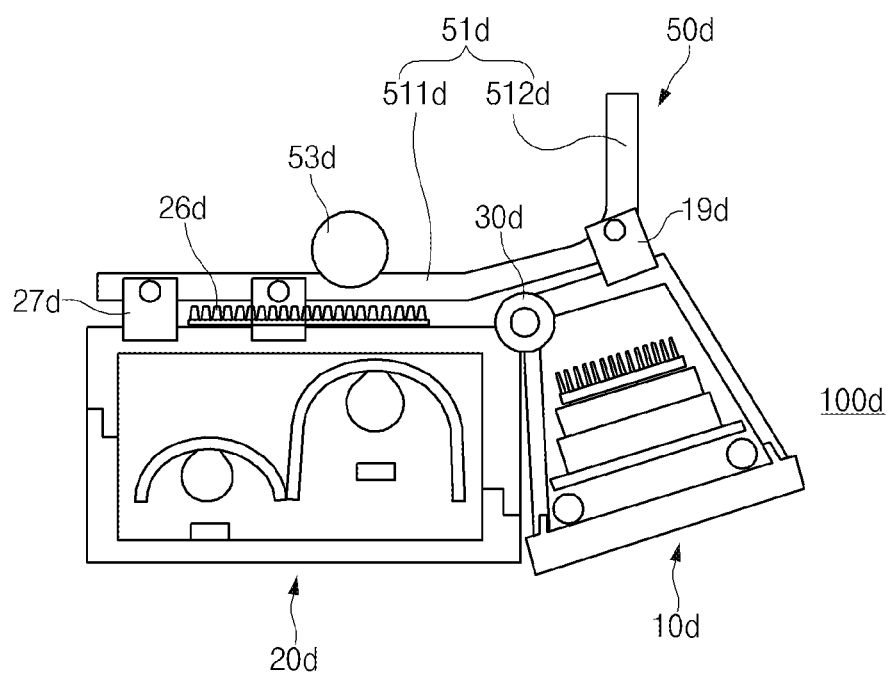
FIG. 12 is a schematic view illustrating a lamp assembly according to a fourth exemplary embodiment of the present disclosure.
Figure 13:
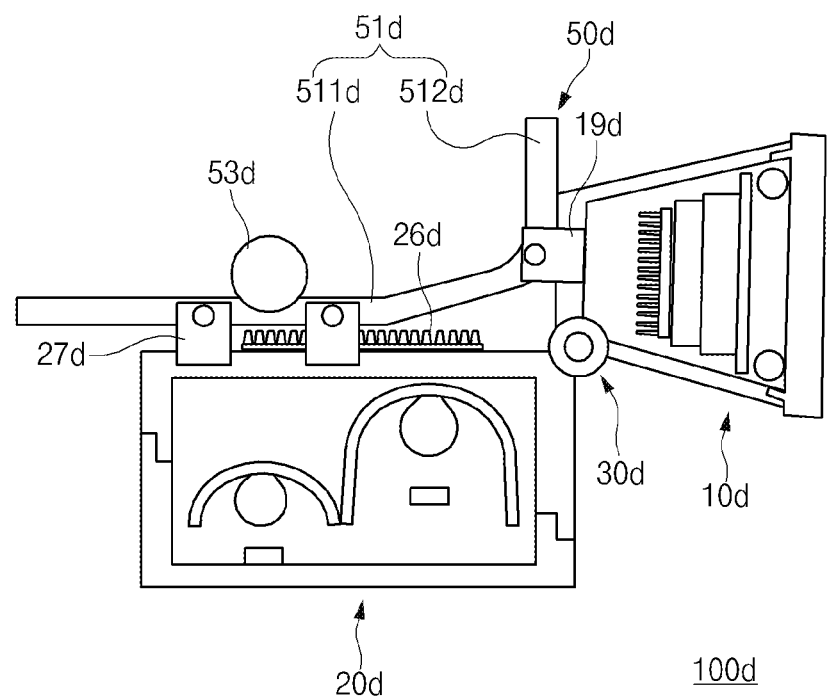
FIG. 13 is a schematic view illustrating a state in which a lamp having a built-in sensor is rotated in the lamp assembly of FIG. 12.

FIG. 12 is a schematic view illustrating a lamp assembly 100d according to a fourth exemplary embodiment of the present disclosure. FIG. 13 is a schematic view illustrating a state in which a lamp 10d having a built-in sensor is rotated in the lamp assembly 100d of FIG. 12.

The fourth embodiment of the present disclosure is the same as the third embodiment as a whole. Therefore, only a difference between the third embodiment and the fourth embodiment will be described below. Referring to FIGS. 12 and 13, the lamp 10d having the built-in sensor of the lamp assembly 100d according to the fourth embodiment of the present disclosure may be coupled to a guide rail 51d to slide along the guide rail 51d included in a guide rail part 50d. A rear lamp 20d may be additionally coupled to the guide rail 51d. The lamp 10d having the built-in sensor may be coupled with the guide rail 51d by a first carrier 19d, and the rear lamp 20d may be coupled with the guide rail 51d by a second carrier 27d. The carriers 19d and 27d may be coupled to the rear lamp 20d and the lamp 10d having the built-in sensor and may be slidably coupled to the guide rail 51d. Accordingly, when the lamp assembly 100d operates as in the fourth embodiment, the lamp assembly 100d may more stably operate without an escape from a determined position.

In the fourth embodiment, as illustrated, a rectilinear-motion actuator 53d may be disposed on the guide rail 51d, and a rack gear part 26d may be disposed on the rear lamp 20d. However, the positions of the rectilinear-motion actuator 53d and the rack gear part 26d may be interchanged.

Figure 14:
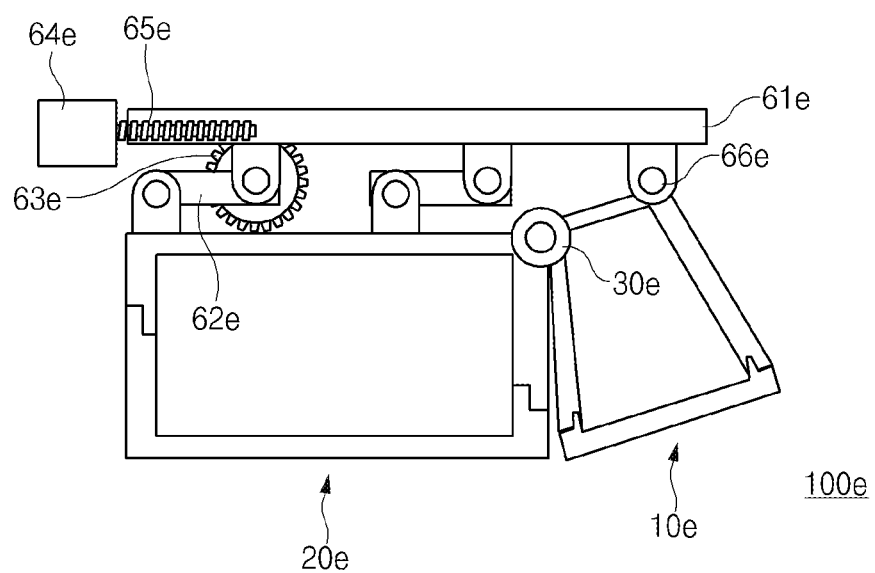
FIG. 14 is a schematic view illustrating a lamp assembly according to a fifth exemplary embodiment of the present disclosure.
Figure 15:
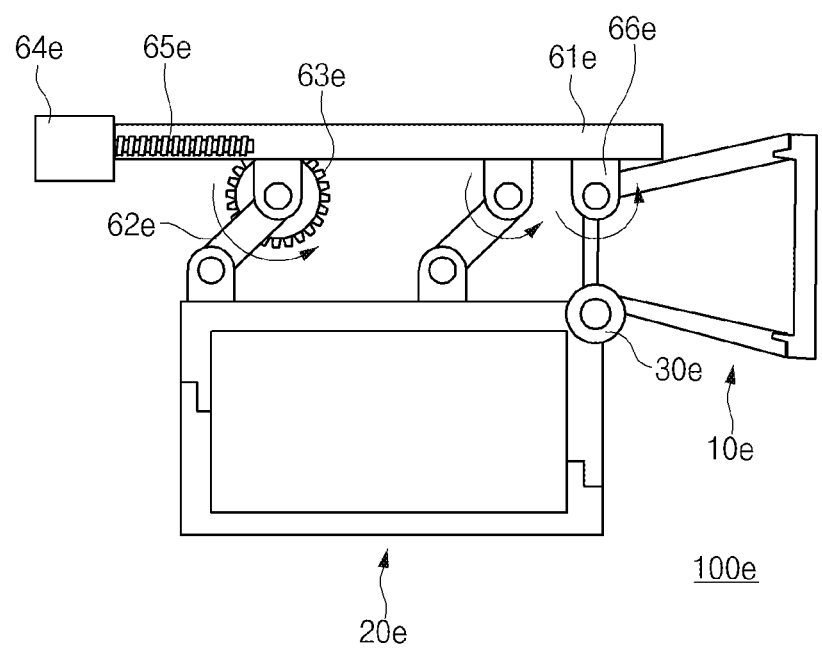
FIG. 15 is a view illustrating a state in which a lamp having a built-in sensor is rotated in the lamp assembly of FIG. 14.

FIG. 14 is a schematic view illustrating a lamp assembly 100e according to a fifth exemplary embodiment of the present disclosure. FIG. 15 is a schematic view illustrating a state in which a lamp 10e having a built-in sensor is rotated in the lamp assembly 100e of FIG. 14.

The fifth embodiment of the present disclosure is the same as the first embodiment as a whole. Therefore, only a difference between the first embodiment and the fifth embodiment will be described below. Referring to FIGS. 14 and 15, the lamp assembly 100e may include a frame 61e, a link part 62e, and a frame hinge 66e so as to shift position and change posture.

The frame 61e is a part that is able to be fixed to a vehicle body. The frame 61e may have a form extending in a left/right direction. The link part 62e may be coupled to the frame 61e so as to be rotatable with respect to the frame 61e.

The link part 62e is rotatably coupled to the frame 61e and a rear lamp 20e to move the position of the rear lamp 20. A plurality of link parts 62e may be provided to stably support the rear lamp 20e. The lamp 10e having the built-in sensor may be rotatably coupled to the frame 61e by the frame hinge 66e so as to be rotatable with respect to the frame 61e. When the position of the rear lamp 20e is changed by an action of the link part 62e (e.g., a rotating movement), the lamp 10e having the built-in sensor may rotate about the frame hinge 66e.

In this case, it is enough that a rotary part 30e simply serves as a hinge, and therefore the rotary part 30e may not include an actuator. Instead, the lamp assembly 100e may include a frame actuator 64e that applies a driving force to the frame 61e, a worm gear 65e that outputs the driving force of the frame actuator 64e, and a frame driven gear 63e that is engaged with the worm gear 65e and coupled to the link part 62e and that rotates the link part 62e in conjunction with rotation of the frame actuator 64e.

Figure 16:
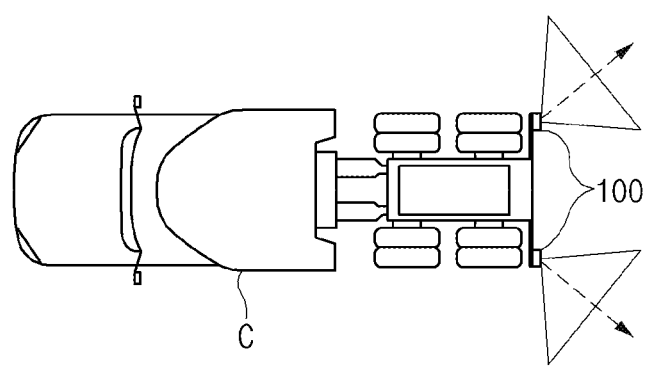
FIG. 16 is a view illustrating a situation in which the lamp assembly according to the first embodiment of the present disclosure is disposed on a vehicle.

FIG. 16 is a view illustrating a situation in which the lamp assembly 100 according to the first embodiment of the present disclosure is disposed on a vehicle C.

Referring to FIG. 16, the lamp assembly 100 according to the first embodiment of the present disclosure may be disposed on a rear side of the vehicle c. So as to detect an object disposed in a blind spot behind the vehicle C, the lamp assembly 100 may be disposed to form a detection area toward a rear side of the vehicle C. The situation in which the posture of the lamp assembly 100 is controlled to form the detection area toward the rear side or the rear lateral side of the vehicle C is referred to as a first mode.

Figure 17:
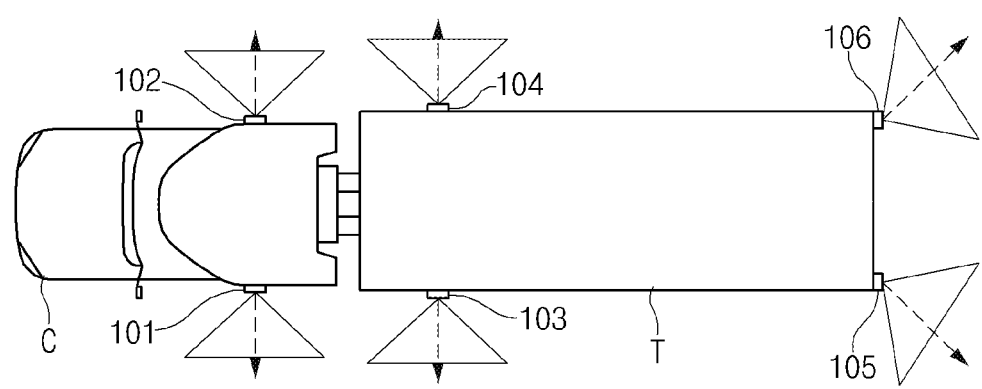
FIG. 17 is a view illustrating a situation in which the lamp assembly according to the first embodiment of the present disclosure is disposed on a vehicle coupled with a towed vehicle to implement a blind-spot detection system.

FIG. 17 is a view illustrating a situation in which the lamp assembly 100 according to the first embodiment of the present disclosure is disposed on a vehicle C coupled with a towed vehicle T to implement a blind-spot detection system.

Referring to FIG. 17, the blind-spot detection system may be implemented by locating lamp assemblies 101, 102, 103, 104, 105, and 106 at predetermined positions of the towed vehicle T and the vehicle C coupled thereto. The blind-spot detection system may include at least four lamp assemblies 101, 102, 103, 104, 105, and 106 that detect a surrounding object, the vehicle C, and a processor. The blind-spot detection system may include the towed vehicle T.

The vehicle C may be a vehicle that is capable of towing the towed vehicle T, such as a trailer, which is connected thereto. The plurality of lamp assemblies 101, 102, 103, 104, 105, and 106 may be rotatably coupled to opposite rear sides and opposite lateral sides of the vehicle C. The towed vehicle T may be coupled to the rear of the vehicle C and may turn independently of the vehicle C.

The processor (not illustrated) may be electrically connected with lamps having built-in sensors that are included in the plurality of lamp assemblies 101, 102, 103, 104, 105, and 106. The processor may recognize the position of an object around the vehicle C by using a signal transferred from each of the plurality of lamp assemblies 101, 102, 103, 104, 105, and 106. Furthermore, the processor may be electrically connected with a steering device of the vehicle C and may recognize the direction in which the vehicle C is steered. The processor may include a microprocessor such as a field programmable gate array (FPGA), an application specific integrated circuit (ASIC), or a central processing unit (CPU). However, the type of a computing device included in the processor is not limited thereto.

The processor may include a memory that stores a plurality of instructions, on the basis of which commands for controlling components are generated. The processor may be programmed to receive the instructions from the memory and generate electrical signals for controlling the components, based on the received instructions. The memory may be a data store such as a hard disk drive (HDD), a solid state drive (SSD), a volatile medium, a non-volatile medium, or the like. However, the type of the memory is not limited thereto.

The lamp assemblies 101, 103, and 105 located on the left sides of the vehicle C and the towed vehicle T may be referred to as the first lamp assembly 101, the third lamp assembly 103, and the fifth lamp assembly 105 in sequence from front to back, and the lamp assemblies 102, 104, and 106 located on the right sides of the vehicle C and the towed vehicle T may be referred to as the second lamp assembly 102, the fourth lamp assembly 104, and the sixth lamp assembly 106 in sequence from front to back. The lamps having the built-in sensors that are included in the lamp assemblies 101, 102, 103, and 104 disposed on the vehicle C may be disposed on opposite lateral sides of the vehicle C. The lamps having the built-in sensors that are included in the fifth lamp assembly 105 and the sixth lamp assembly 106 that are disposed at the rear of the towed vehicle T may be disposed to face a rear lateral direction. The lamps having the built-in sensors that are included in the third lamp assembly 103 and the fourth lamp assembly 104 that are disposed at the rear of the vehicle C may be disposed to face a lateral direction. This is because a faulty signal is likely to be input by the towed vehicle T when the lamps having the built-in sensors that are included in the third lamp assembly 103 and the fourth lamp assembly 104 face a rear lateral direction. The situation in which the postures of the lamp assemblies 103 and 104 disposed at the rear of the vehicle C are controlled to form a detection area toward a side of the vehicle C is referred to as a second mode.

Figure 18:
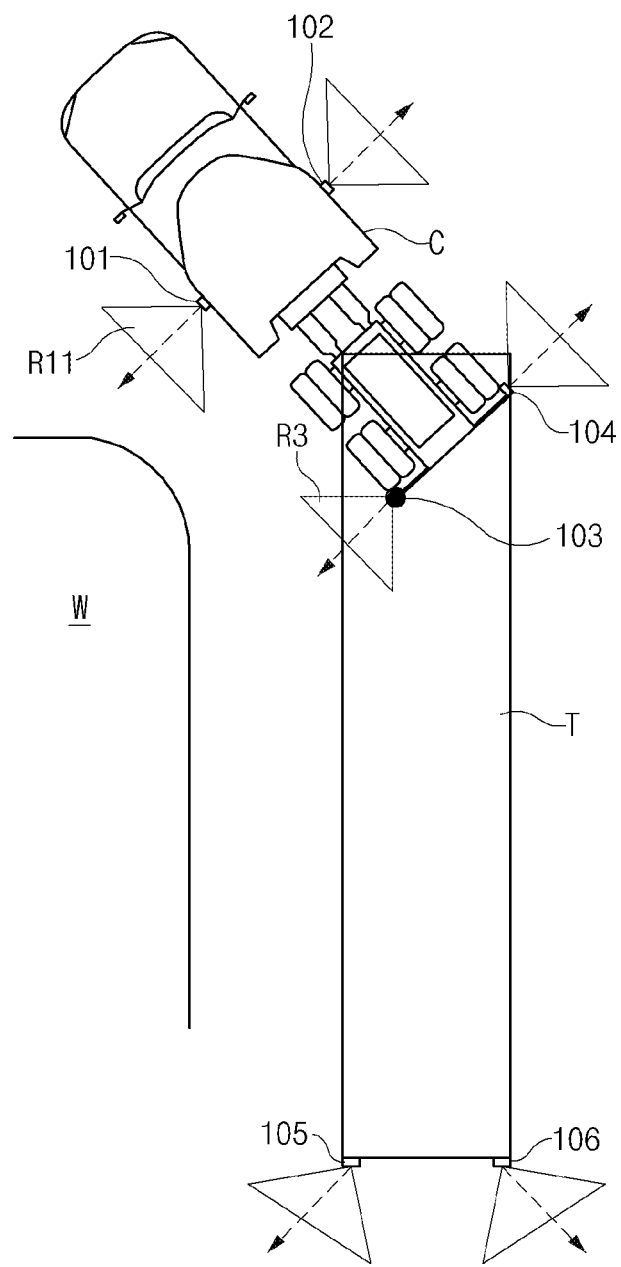
FIG. 18 is a view illustrating a situation in which the vehicle of FIG. 17 turns in one direction.

FIG. 18 is a view illustrating a situation in which the vehicle C of FIG. 17 turns in one direction.

When the vehicle C makes a left turn at a corner of a wall W on a left side as illustrated in FIG. 18, only the vehicle C may be obliquely located to face leftward, and the towed vehicle T may be maintained in the direction in which the towed vehicle T travels straight. At this time, a detection area R3 of the third lamp assembly 103 disposed on the rear left side of the vehicle C may overlap the towed vehicle T. Because the processor determines only the presence or absence of an object and the distance from the object but not what the object is, the processor may determine that the object is present in a very close position, regardless of whether the actually detected object is the towed vehicle T or not. That is, the third lamp assembly 103 detects an abnormal signal and transfers the abnormal signal to the processor.

In the case where one of the lamp assemblies 103 and 104 disposed on the opposite rear sides detects an abnormal signal when the vehicle C turns a corner, the processor may perform control to stop operation of the lamp having the built-in sensor that is included in the lamp assembly that detects the abnormal signal. Because the third lamp assembly 103 detects the abnormal signal in the drawing, the processor may stop operation of the lamp having the built-in sensor that is included in the third lamp assembly 103.

Figure 19:
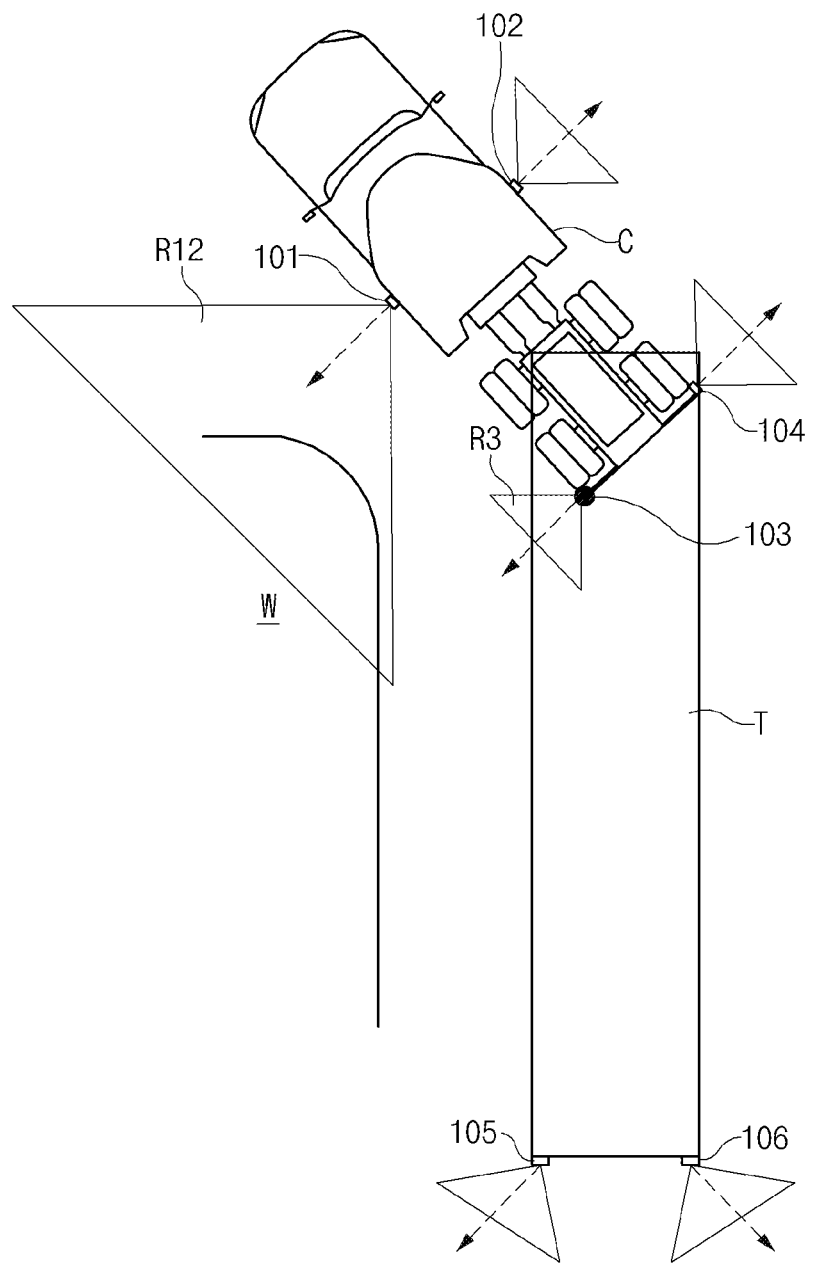
FIG. 19 is a view illustrating a situation in which adjustments to detection areas of lamp assemblies are made in the vehicle of FIG. 18.

FIG. 19 is a view illustrating a situation in which adjustments to the detection areas of the lamp assemblies 101, 102, 103, 104, 105, and 106 are made in the vehicle C of FIG. 18.

When detection operation of the third lamp assembly 103 is stopped, it is not easy to detect a blind spot on a left side of the vehicle C. To compensate for this, the processor may perform control to expand a detection area of another lamp assembly located on the same side as the lamp assembly that detects the abnormal signal. In particular, the processor may perform control to expand a detection area of a lamp assembly located ahead on the same side. Accordingly, the processor may perform control to make a detection area R12 of the first lamp assembly 101, which is located on the left side of the vehicle C like the third lamp assembly 103, lager than a detection area R11 in FIG. 18.

After the vehicle C completely turns, the processor may operate the stopped lamp assembly again to determine whether an abnormal signal is detected, and when an abnormal signal is not detected, the processor may continue to maintain operation. In the case where an abnormal signal is still detected, the processor may perform control to stop operation again.

Figure 20:
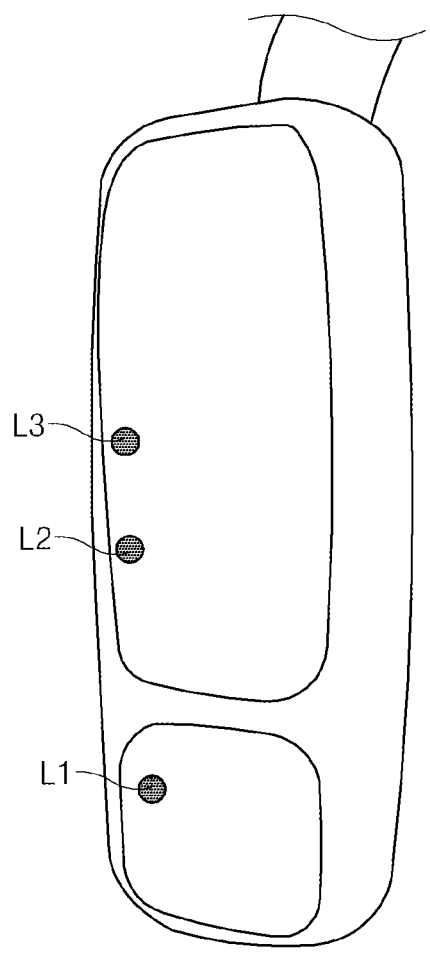
FIG. 20 is a view illustrating a situation in which an indicator for a user is installed on a side mirror of a vehicle equipped with the lamp assembly according to the first embodiment of the present disclosure.

FIG. 20 is a view illustrating a situation in which an indicator for a user is installed on a side mirror M of the vehicle C equipped with the lamp assembly 100 according to the first embodiment of the present disclosure.

Referring to FIG. 20, the blind-spot detection system may include a plurality of indicators L1, L2, and L3 disposed on the side mirror M of the vehicle C. The indicators L1, L2, and L3 may be configured to emit light and may correspond to different lamp assemblies 100. In the case where an abnormal signal is detected in a corresponding lamp assembly 100, a corresponding indicator may emit light, may change the color of the light, or may vary a light-emitting pattern.

For the user's intuitive recognition, the lowermost indicator L1 may correspond to the lamp assembly 100 located ahead, the intermediate indicator L2 may correspond to the lamp assembly 100 located in the middle, and the uppermost indicator L3 may correspond to the lamp assembly 100 located behind. Furthermore, for the user's intuitive recognition, indicators corresponding to the lamp assemblies 100 disposed on the left side may be disposed on a left side mirror M, and indicators corresponding to the lamp assemblies 100 disposed on the right side may be disposed on a right side mirror M.

In addition, the blind-spot detection system may include a speaker (not illustrated) that, when there is a lamp assembly 100 that detects an abnormal signal, generates a beep sound to inform the user of the detection of the abnormal signal.

Figure 21:
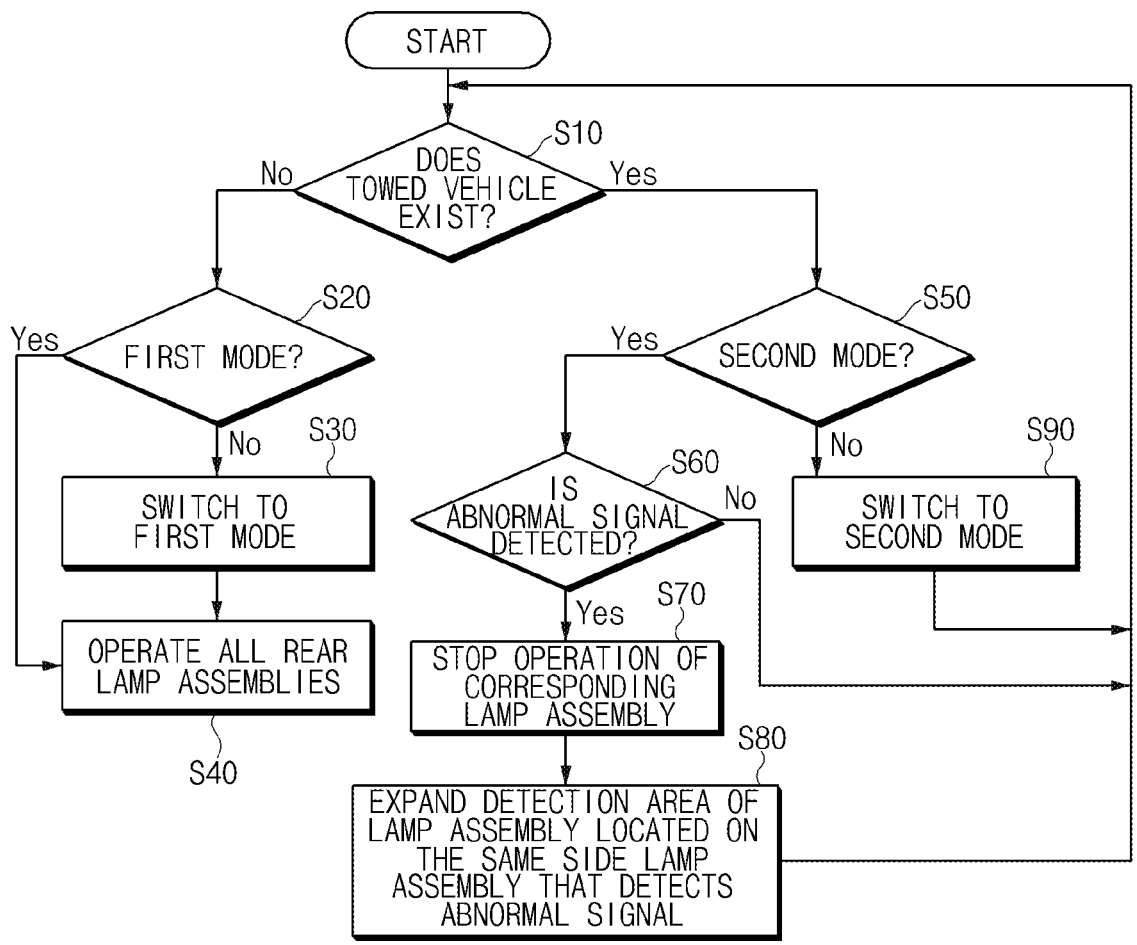
FIG. 21 is a flowchart illustrating a blind-spot detection method according to an exemplary embodiment of the present disclosure.

FIG. 21 is a flowchart illustrating a blind-spot detection method according to an exemplary embodiment of the present disclosure.

The blind-spot detection method of the present disclosure may be implemented by using the blind-spot detection system. The blind-spot detection method may start from S10 of determining whether a towed vehicle T connected to the vehicle C is present.

When the towed vehicle T is present, the processor may determine whether lamps 10 having built-in sensors of two rear lamp assemblies 100 are in the first mode of facing a rear lateral direction (S20). When not, the processor controls the corresponding rear lamp assemblies 100 in the first mode (S30). Thereafter, the processor operates all the rear lamp assemblies 100 to monitor the rear side (S40).

In the case where there is no towed vehicle T, the processor may determine whether the lamps 10 having the built-in sensors of the two rear lamp assemblies 100 are in the second mode of facing a lateral direction (S50). When not, the processor performs control to allow the corresponding rear lamp assemblies 100 to be in the second mode (S90) and thereafter returns to the starting point.

When the lamps 10 having the built-in sensors of the two rear lamp assemblies 100 are in the second mode, the processor may determine whether an abnormal signal is detected in the two rear lamp assemblies 100 (S60). When it is determined that the vehicle C turns and the rear lamp assembly 100 located in the direction in which the vehicle C turns detects an abnormal signal, the processor may stop operation of the corresponding lamp assembly 100 (S70). Furthermore, to compensate for a detection area, the processor may expand the detection area of the lamp assembly 100 located on the same side as the lamp assembly 100 that detects the abnormal signal (S80). When it is determined that the abnormal signal is detected, a step of informing a user of the detection of the abnormal signal by using an indicator or a speaker may be additionally performed.

According to the embodiments of the present disclosure, even in a commercial vehicle towing a trailer, a sensor may be disposed without waste of space, and a blind spot may be effectively detected.

Hereinabove, even though all of the components are coupled into one body or operate in a combined state in the description of the above-mentioned embodiments of the present disclosure, the present disclosure is not limited to these embodiments. That is, all of the components may operate in one or more selective combination within the range of the purpose of the present disclosure. It should be also understood that the terms of "include", "comprise" or "have" in the specification are "open type" expressions just to say that the corresponding components exist and, unless specifically described to the contrary, do not exclude but may include additional components. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A lamp having a built-in sensor, the lamp comprising:
   a lamp housing having a lamp opening on one side thereof in a longitudinal direction of the lamp;
   a light-transmitting outer glass configured to cover the lamp opening;
   a light guide disposed on an inside surface of the lamp housing and configured to emit light;
   an inner glass located ahead of the light guide inside the lamp housing with respect to the longitudinal direction; and
   a sensor disposed inside the lamp housing and located ahead of the inner glass with respect to the longitudinal direction and configured to sense a surrounding object.

2. The lamp of claim 1, wherein the inner glass includes a reflection surface on one side thereof, and
   wherein the reflection surface has a reflectivity such that light emitted from the light guide is reflected between the inner glass and the outer glass or transmitted to an outside of the lamp housing through the outer glass to form an image.

3. The lamp of claim 1, further comprising:
an outer lens configured to refract a path of light emitted through the outer glass such that the light emitted through the outer glass forms an image.

4. A lamp assembly comprising:
a lamp having a built-in sensor, the lamp including a sensor configured to sense a surrounding object and a light guide configured to emit light;
a rear lamp including a light-emitting part configured to emit light; and
a rotary part configured to connect the rear lamp and the lamp having the built-in sensor such that the rear lamp and the lamp are rotatable relative to each other.

5. The lamp assembly of claim 4, further comprising:
a guide rail to which the rear lamp is coupled,
wherein the rear lamp is slidable along the guide rail, and
wherein the rotary part rotates the lamp having the built-in sensor relative to the rear lamp as the rear lamp slides.

6. The lamp assembly of claim 5, wherein the lamp having the built-in sensor is coupled to the guide rail and slidable along the guide rail.

7. The lamp assembly of claim 4, further comprising:
a link part rotatably coupled to the rear lamp to move a position of the rear lamp; and
a frame to which the link part is additionally coupled so as to be rotatable relative to each other.

8. The lamp assembly of claim 7, further comprising:
a frame hinge rotatably coupled to the lamp having the built-in sensor and coupled to the frame such that the lamp having the built-in sensor is rotatable to the frame hinge when the position of the rear lamp is changed by a movement of the link part.

9. A blind-spot detection system comprising:
at least four lamp assemblies configured to detect a surrounding object;
a vehicle having the at least four lamp assemblies coupled to opposite rear sides and opposite lateral sides of the vehicle, the at least four lamp assemblies being rotatable with respect to the vehicle;
a towed vehicle coupled to a rear side of the vehicle; and
a processor electrically connected with the at least four lamp assemblies,
wherein lamps having built-in sensors that are included in the lamp assemblies are disposed to face toward the opposite lateral sides of the vehicle, and
wherein, when one lamp assembly located in a direction in which the vehicle turns, among respective lamp assemblies disposed on the opposite rear sides, detects an abnormal signal, the processor performs control to stop operation of the lamp having the built-in sensor of the one lamp assembly that detects the abnormal signal.

10. The blind-spot detection system of claim 9, wherein the processor performs control to expand a detection area of another lamp assembly located on a same side as the one lamp assembly that detects the abnormal signal.

11. A method for detecting a blind spot using at least four lamp assemblies configured to detect a surrounding object and a vehicle having the at least four lamp assemblies coupled to opposite rear sides and opposite lateral sides of the vehicle so as to be rotatable relative to each other, the method comprising:
determining whether a towed vehicle connected to the vehicle is present;
determining whether two rear lamp assemblies disposed on the opposite rear sides of the vehicle among the at least four lamp assemblies face a lateral direction when the towed vehicle is present;
detecting an abnormal signal by a rear lamp assembly of the two rear lamp assemblies, the rear lamp assembly located in a direction in which the vehicle turns, when lamps having built-in sensors that are included in the two rear lamp assemblies face the lateral direction and the vehicle turns; and
stopping operation of the rear lamp assembly that detects the abnormal signal.

12. The method of claim 11, further comprising:
expanding a detection area of another lamp assembly located on a same side as the rear lamp assembly that detects the abnormal signal.

13. The method of claim 11, further comprising:
when at least one lamp of the lamps having the built-in sensors, that are included in the two rear lamp assemblies, does not face the lateral direction, rotating the at least one lamp that does not face the lateral direction such that the at least one lamp faces the lateral direction.

14. The method of claim 11, further comprising:
determining whether the lamps having the built-in sensors of the two rear lamp assemblies face an aft direction when the towed vehicle is not present; and
when at least one lamp of the two lamps having the built-in sensors faces the lateral direction, rotating the at least one lamp that faces the lateral direction such that the at least one lamp faces the aft direction.

* * * * *